(12) United States Patent
Jeon et al.

(10) Patent No.: US 10,980,042 B2
(45) Date of Patent: Apr. 13, 2021

(54) METHOD AND APPARATUS FOR GUARANTEEING QUALITY OF SERVICE IN WIRELESS COMMUNICATION SYSTEM

(71) Applicant: Samsung Electronics Co., Ltd., Suwon-si (KR)

(72) Inventors: Namryul Jeon, Seoul (KR); Daejoong Kim, Yongin-si (KR); Eunyong Kim, Yongin-si (KR); Seungbo Ryu, Yongin-si (KR); Balgeum Choe, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 16/607,193

(22) PCT Filed: May 25, 2018

(86) PCT No.: PCT/KR2018/005951
§ 371 (c)(1),
(2) Date: Oct. 22, 2019

(87) PCT Pub. No.: WO2018/217056
PCT Pub. Date: Nov. 29, 2018

(65) Prior Publication Data
US 2020/0389907 A1     Dec. 10, 2020

(30) Foreign Application Priority Data
May 25, 2017   (KR) .................. 10-2017-0064509

(51) Int. Cl.
*H04W 72/12* (2009.01)
*H04W 72/08* (2009.01)
(52) U.S. Cl.
CPC ..... *H04W 72/1236* (2013.01); *H04W 72/087* (2013.01)

(58) Field of Classification Search
CPC ........... H04W 28/0268; H04W 72/087; H04W 72/12; H04W 72/1236
See application file for complete search history.

(56) References Cited

U.S. PATENT DOCUMENTS 9,154,286 B2   6/2015   Zisimopoulos et al.
9,351,309 B1 *  5/2016   Hinkle .................... H04W 4/12
(Continued)

FOREIGN PATENT DOCUMENTS

EP    2 830 380 A1    1/2015
KR    10-1536728 B1   7/2015
(Continued)

OTHER PUBLICATIONS

Huawei et al: "Solution for key issue 2: NextGen Bearer based QoS control mechanism", 3GPP Draft, S2-163397, 3rd Generation Partnership Project (3GPP), Mobile Competence Centre; 650, Route Des Lucioles, F-06921 Sophia-Antipolis Cedex ; France, vol. SA WG2, No. Vienna; 20160711-20160715, Jul. 10, 2016 (Jul. 10, 2016), XP051118000.
(Continued)

*Primary Examiner* — Kashif Siddiqui
(74) *Attorney, Agent, or Firm* — Jefferson IP Law, LLP

(57) ABSTRACT

The present disclosure relates to a 5G or pre-5G communication system for supporting a higher data transmission rate beyond a 4G communication system such as LTE. The present invention relates to a method for guaranteeing quality of service in a wireless communication system. More particularly, a method of a base station according to an embodiment of the present invention comprises the steps of: identifying at least one non-Guaranteed bit rate (GBR) bearer configured for an arbitrary communication device; determining whether to guarantee a specific bit rate to the non-GBR bearer, on the basis of at least one of QoS class identifier (QCI) information, allocation and retention prior-
(Continued)

ity (ARP) information, and subscriber profile identifier (SPID), which are received from a core network node for the non-GBR bearer; and performing scheduling for the non-GBR bearer on the basis of the determination.

13 Claims, 10 Drawing Sheets

(56) References Cited

U.S. PATENT DOCUMENTS

| | | |
|---|---|---|
| 2004/0203450 A1 | 10/2004 | Cho |
| 2008/0248807 A1 | 10/2008 | Kim et al. |
| 2010/0322069 A1 | 12/2010 | Song et al. |
| 2015/0029950 A1 | 1/2015 | Rath et al. |
| 2015/0110044 A1* | 4/2015 | Berzin ............... H04W 28/0252 370/329 |
| 2015/0131545 A1* | 5/2015 | Ameigeiras Gutierrez ................. H04W 72/1236 370/329 |
| 2015/0156668 A1 | 6/2015 | Paredes |
| 2015/0250016 A1* | 9/2015 | Kotecha ................ H04W 72/10 370/329 |
| 2015/0282152 A1 | 10/2015 | Wang et al. |
| 2016/0278111 A1 | 9/2016 | Li |
| 2019/0320474 A1* | 10/2019 | Lu ........................... H04W 4/24 |

FOREIGN PATENT DOCUMENTS

| | | |
|---|---|---|
| KR | 10-2016-0140857 A | 12/2016 |
| KR | 10-1716858 B1 | 3/2017 |
| WO | 2013/127665 A1 | 9/2013 |

OTHER PUBLICATIONS

Extended European Search Report dated Feb. 19, 2020, issued in European Application No. 18806308.5.

Mike Lowe, Netflix UHD 4K interview: When, where and how to get 4K content, http://www.pocket-lint.com/news/126457-netflix-uhd-4k-interview-when-where-and-how-to-get-4k-content, Jan. 14, 2014.

European Office Action dated Feb. 10, 2021, issued in European Application No. 18 806 308.5-1215.

* cited by examiner

FIG. 2B

| QCI | 1 | 2 | 3 | 4 | 5 | 6 | | 7 | | 8 | | 9 | |
|---|---|---|---|---|---|---|---|---|---|---|---|---|---|
| ARP | - | - | - | - | - | 8 | 9 | 8 | 9 | 8 | 9 | 8 | 9 |
| Type | GBR | | | | NGBR | minBR | Non GBR | minBR | Non GBR | minBR | Non GBR | minBR | Non GBR |
| Priority 1 | - | - | - | - | - | 5 | 1 | 6 | 2 | 7 | 3 | 8 | 4 |
| Priority 2 | - | - | - | - | - | 1 | 2 | 3 | 4 | 5 | 6 | 7 | 8 |
| DL Bitrate | | | | | | 20Mbps | | 10Mbps | | 20Mbps | | 50Mbps | |
| UL Bitrate | | | | | | 20Mbps | | 5Mbps | | 20Mbps | | 10Mbps | |

METHOD AND APPARATUS FOR GUARANTEEING QUALITY OF SERVICE IN WIRELESS COMMUNICATION SYSTEM

TECHNICAL FIELD

The disclosure relates to a method and apparatus for efficiently utilizing physical resources and guaranteeing quality of service in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, although different in communication standards and modes (e.g., wireline Ethernet/IP and wireless LTE/WiBro/Wi-Fi), all of wireline and wireless communication networks provide quality of service (QoS) functions based on certain standards (IETF RFC, IEEE 802, 3GPP, etc.). For example, the QoS may vary according to the priority of service type supported by a device. As a detailed example, real time service traffic such as voice or video traffic may have a QoS higher than that of Internet traffic.

The QoS may be mapped to a bearer established between a device and a network node. Here, the bearer may be categorized into one of a guaranteed bit rate (GBR) bearer and a non-GBR bearer according to resource type. In detail, the GBR bearer may denote a bearer guaranteeing a predetermined bit rate. That is, to use a GBR bearer means to guarantee at least a predetermined bit rate for transmitting service data. Whereas, the non-GBR bearer may be regarded as a best effort type bearer that does not guarantee any predetermined bit rate.

Meanwhile, 5G systems may be designed to support a fixed wireless access (FWA) system that is capable of providing more homes and offices with high speed Internet services by replacing optical cable sections with wireless sections. Even to the FWA system, the above-described QoS may be applied likewise. For example, even in the FWA system, the GBR type QoS may be applied to the services necessary to guarantee a predetermined bit rate such as IPTV rather than the Internet service within the constrained physical resources.

However, in the case where a communication device communicating on a GBR bearer is located in a weak electric field area occupying a large amount of resources, other communication devices sharing the resources of the base station may experience difficulty in receiving services. Furthermore, if the non-GBR type QoS is applied to the services of which qualities are maintained at over a predetermined data rate so such resources are indiscriminately allocated, this may cause a situation unsatisfying a service quality standard. There is therefore a need of a method for efficiently utilizing the entire physical resources of the FWA base station system.

DISCLOSURE OF INVENTION

Technical Problem

The disclosed embodiments aim to provide a method for efficiently allocating physical resources for a bearer to guarantee better qualities of services.

Solution to Problem

According to an embodiment of the disclosure, a method of a bases station includes identifying at least one non-guaranteed bit rate (non-GBR) bearer configured for a communication device, determining whether to guarantee a predetermined bit rate on the non-GBR bearer based on at least one of Quality of Service Class Identifier (QCI) information, Allocation and Retention Priority (ARP) information, and Subscriber Profile Identifier (SPID) information that are received in association with the non-GBR bearer from a core network node, and performing scheduling on the non-GBR bearer based on a result of the determination.

According to an embodiment of the disclosure, a base station includes a transceiver configured to receive Quality of Service Class Identifier (QCI) information of at least one non-guaranteed bit rate (non-GBR) bearer configured to a communication device from a core network and a controller configured to control to identify at least non-GBR bearer configured for the communication device, determine whether to guarantee a predetermined bit rate on the non-GBR bearer based on at least one of QCI information, Allocation and Retention Priority (ARP) information, and Subscriber Profile Identifier (SPID) information and perform scheduling on the non-GBR bearer based on a result of the determination.

Advantageous Effects of Invention

The base station proposed in the disclosed embodiments is advantageous in terms of improving qualities of services by scheduling at least one communication device configured with a non-GBR bearer in consideration of characteristics of the service being provided on the non-GBR bearer and a constrained resource amount.

BRIEF DESCRIPTION OF DRAWINGS

FIG. 2B is a diagram illustrating a table of bearer-specific configuration metrics according to an embodiment of the disclosure;

MODE FOR THE INVENTION

Figure 1:
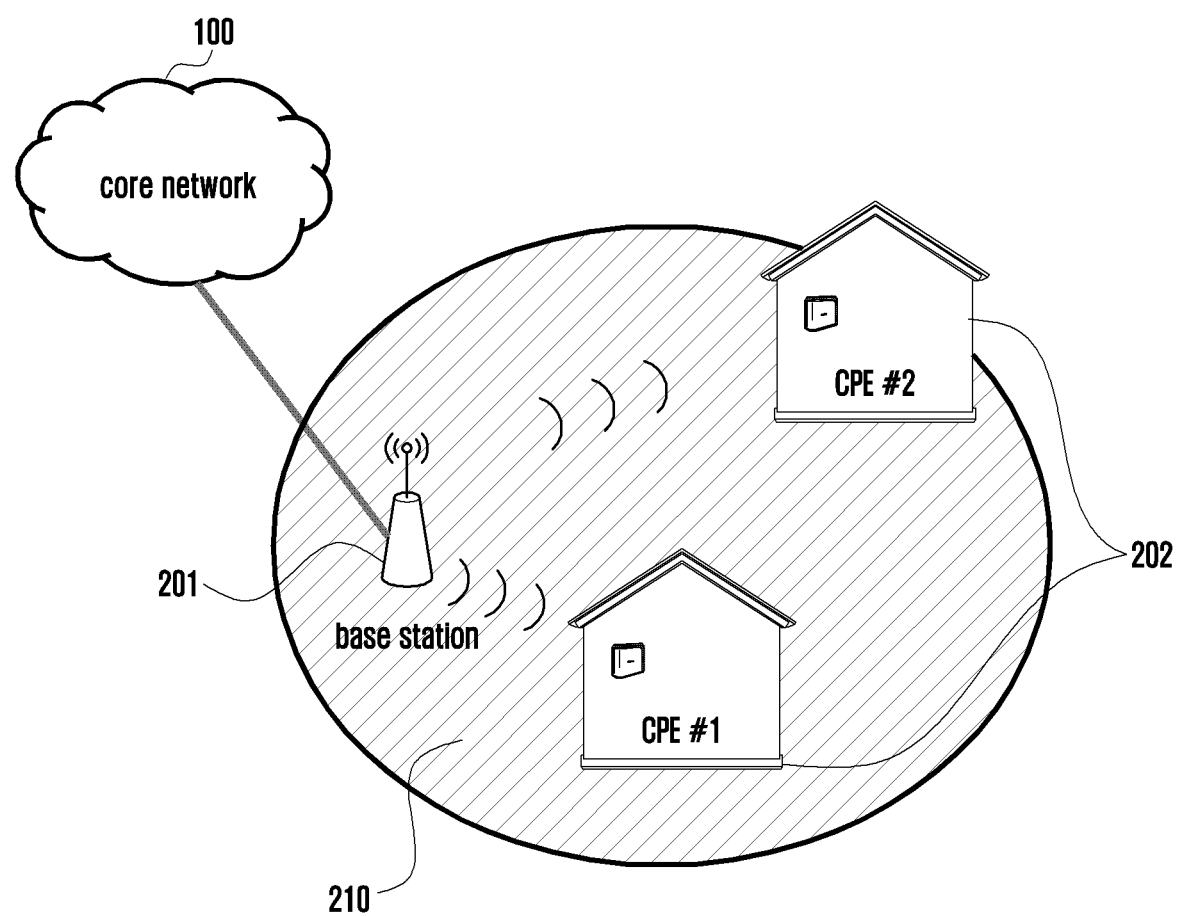
FIG. 1 is a conceptual view for explaining a structure of a communication system according to an embodiment of the disclosure.

Detailed description of well-known functions and structures incorporated herein may be omitted to avoid obscuring the subject matter of the disclosure. Further, the following terms are defined in consideration of the functionality in the disclosure, and they may vary according to the intention of a user or an operator, usage, etc. Therefore, the definitions should be made on the basis of the overall content of the present specification.

Although the disclosed embodiments are directed to specific systems, it will be understood by those skilled in the art that the disclosed embodiments can be applied even to other communication systems having a similar technical background and channel format, with a slight modification, without departing from the spirit and scope of the present invention.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

The methods and apparatuses for guaranteeing services according to the disclosed embodiments are described hereinafter with reference to the accompanying drawings.

The disclosed embodiments provide a method for efficiently supporting QoS in an FWA system in use for guaranteeing high-speed Internet service in more homes and offices.

FIG. 1 is a conceptual view for explaining a structure of a communication system according to an embodiment of the disclosure.

In the disclosed embodiment of FIG. 1, an FWA system may include a core network 100, a base station 201, and at least one communication device 202 included in a coverage area of the base station.

According to an embodiment of the disclosure, the core network 100 may perform signaling and control functions for supporting network access, network resource allocation, tracking, paging, roaming, and handover in association with the at least one communication device 202. For example, the core network 100 may include an access and mobility management function (AMF), a session management function (SMF), and a user plane function (UPF).

According to an embodiment of the disclosure, the communication system may include at least one communication device 202 that is capable of performing wireless communication with a base station 201 included in the communication system. Examples of the at least one communication device 202 include all types of devices capable of performing wireless communication with the base station. Examples of the at least one communication device 202 may include portable devices such as a user device, a terminal, and a mobile device. Examples of the at least one communication device 202 may include customer-premises equipment (CPE) installed in a building for connection to a service of a communication service provider and associated with all terminals connected to in-building devices through a local area network (LAN). Although the at least one communication device 300 is exemplified by the CPE in FIG. 1, it is not limited thereto.

In the embodiment of FIG. 1, the at least one communication device 202 may be located anywhere within the coverage area 210 of the base station 201. For example, the at least one communication device 202 may be located at a location close to the base station (#CPE 1) so as to be advantageous for communication with the base station 201 or a location far from the base station (#CPE 2) so as to be disadvantageous for communication with the base station 202 because of relatively weak electric fields (edge of the coverage area of the base station).

According to an embodiment of the disclosure, the communication system may include the base station 201 as described above. According to an embodiment of the disclosure, the base station may be connected to the core network 100 through a wireline connection (optical cable, etc.) and to the at least one communication device 202 through a wireless connection. The base station 201 may perform various functions on the connection with the communication device 202 based on information or messages received from the core network 100.

According to an embodiment of the disclosure, the base station 201 may configure a bearer suitable for QoS attributes to the at least one communication device 202 based on QoS-related information received from the core network 100. According to an embodiment of the disclosure, the base station 201 may perform wireless packet transmission scheduling for a service to the at least one communication device 202.

According to an embodiment of the disclosure, the base station 201 may receive the QoS-related information from the core network 100 and provide a user of the communication device with a service based on the QoS-related information.

Here, the QoS-related information may be conveyed in an initial context setup request (Initial Context Setup Request) message or a radio access bearer setup request (E-RAB Setup Request) message being transmitted by the core network 100 in response to a bearer setup request. The QoS-related information may include QoS parameters for use in assessing a per-service quality level. For example, the QoS parameters may include QoS Class Identifier (QCI) information related to a priority of QoS and Allocation and Retention Priority (ARP) information related to EPS bearer creation and rejection.

For example, if the base station 201 receive QoS-related information from the core network 100, it may configure a type of bearer to be established for a connection with a communication device based on the QoS parameters included in the QoS-related information and predetermined metrics. For example, the base station 201 may configure a GBR type or non-GBR type bearer based on the QoS parameters.

The base station 201 may perform scheduling for providing the communication device with a service according to the type of the bearer within a range of constrained physical resources. For example, the base station may allocate physical resources for a GBR type bearer so as to guarantee a predetermined bit rate based on the channel condition. The base station 201 may also allocate certain physical resources for a non-GBR type bearer within a range of physical resources remaining after allocation for the GBR bearer. For example, in the case where the resources are allocated by transmission time interval (TTI), the non-GBR bearer is allocated physical resources within a range of physical resources remaining after allocation for the GBR bearer during one TTI.

In a multiuser radio access system, however, there may be an exceptional situation such as a service of which the predetermined data rate is not guaranteed because of no GBR configuration or a service consuming a larger amount of physical resources than is necessary for a good channel condition because of being located in a weak electric field area or having a bad channel condition in spite of not being significantly impacted by a constrained physical resource amount. If the base station performs scheduling indiscriminately based on only the QCI information and predetermined metrics in such an exceptional situation, a problem may arise in that the base station cannot efficiently allocate physical resources to many communication devices located in its coverage area.

Figure 2A:
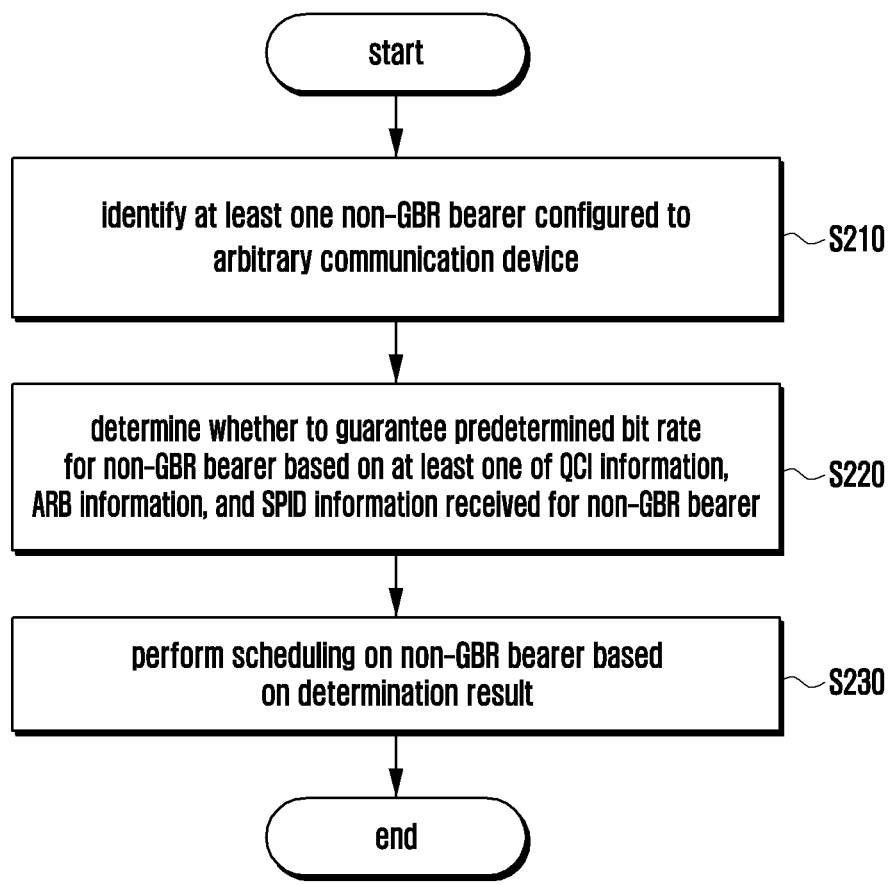
FIG. 2A is a flowchart illustrating a method for a base station to schedule communication devices according to an embodiment of the disclosure.

FIG. 2A is a flowchart illustrating a method for a base station to schedule communication devices according to an embodiment of the disclosure, and FIG. 2B is a diagram illustrating a table of bearer-specific configuration metrics according to an embodiment of the disclosure.

In the disclosed embodiment of FIG. 2A, the base station may check, at step S210, for a non-GBR bearer configured for an arbitrary communication device.

According to an embodiment of the disclosure, the base station may receive QoS-related information of a certain service from a core network, determine a characteristic (or type) of the bearer based on QoS information, ARP information, and predetermined metrics included in the QoS-related information, and establish the corresponding bearer. According to an embodiment of the disclosure, the base station may establish the bearer of the type determined based on the QCI information corresponding to the service requested by the arbitrary communication device.

According to an embodiment of the disclosure, the base station may establish a GBR bearer for the case where the QoS information corresponding to the requested service has a high priority and a non-GBR bearer for the case where the QoS information corresponding to the requested service has a low priority.

According to an embodiment of the disclosure, the base station may ascertain (identify) the bearers configured as non-GBR bearers and determine at step S220 whether to guarantee a predetermined bit rate for the non-GBR bearers based on at least one of the QCI information, ARP information, and SPID information received, in association with the non-GBR bearer, from the core network.

According to an embodiment of the disclosure, the base station may treat a non-GBR bearer satisfying a predetermined metric among non-GBR bearers as a GBR bearer and configure the corresponding bearer such that a predetermined bit rate is guaranteed thereon. According to an embodiment of the disclosure, the predetermined metrics are may be used for determining whether to guarantee the predetermined bit rate on a bearer based on the per-bearer attribute information according to the characteristics of the bearer (e.g., QCI information related to QoS priority, ARP information related to EPS bearer creation and rejection, and subscriber profile identifier (SPID) information being transmitted from an operator server to the base station for use in identifying a terminal of a certain subscriber) and may be configured for each of uplink and downlink.

According to an embodiment of the disclosure, the predetermined metrics may relate to the priority of the QCI information and ARP information and include a first metric for determining a certain bearer according to the priority of the ARP information among the bearers of which a QCI value falls in a predetermined range and a second metric for determining a bearer according to the priority of the QCI information and, if there are multiple bearers with the same QCI information, selecting one of the determined bearers according to their ARP information priorities.

In reference to FIG. 2B, according to an embodiment of the disclosure, the base station may determine the bearers with the prioritized ARP information among the bearers with QCI information in the range from 6 to 9 (bearers with the ARP of 8 in FIG. 2B) as specific bearers for guaranteeing a predetermined bit rate using the first criterion. According to an embodiment of the disclosure, the base station may first select bearers prioritized with the QCI information (QCI=6) and determine the bearers prioritized with the ARP information (ARP=8) among the bearers with the QCI value of 6 using the second criterion.

Although the description is directed to an embodiment where bearers are selected using a criterion configured in association with the priorities of the QCI information and ARP information, it may also be considered for an embodiment in which bearers configured to predetermined terminals are determined as specific bearers among the bearers that are first selected in consideration of the SPID information as identity information of specific terminals that are received from an operator server in addition to the priorities of the QCI information and ARP information.

Once it is determined to guarantee the predetermined bit rate on the non-GBR bearer according to a metric preconfigured by the base station, the base station may perform, at step S230, scheduling on the non-GBR bearer based on the determination result.

For example, if a GBR bearer is configured, the base station may allocate physical resources for packet transmission at the smallest bit rate that should be guaranteed on the GBR bearer based on the channel condition for the GBR bearer. In the case of TTI-based resource allocation, the base station may also allocate certain physical resources for the non-GBR bearer in a range of physical resources remaining after allocating the physical resources for the GBR bearer during a TTI.

According to an embodiment, the base station may allocate physical resources to secure a predetermined bit rate for a specific non-GBR bearer determined to guarantee a predetermined bit rate thereon among non-GBR bearers. In the case where there are multiple specific bearers, the base station may allocate physical resources based on priorities of the specific bearers. According to an embodiment of the disclosure, the predetermined bit rate may be calculated by a separate calculator based on previous operation statistics.

According to an embodiment of the disclosure, if it is determined not to guarantee a predetermined bit rate on the non-GBR bearer, the base station may allocate certain physical resources such that the non-GBR bearer provides for best effort transmission.

That is, according to an embodiment of the disclosure, the base station may allocate constrained physical resources for GBR bearers preferentially and then for non-GBR bearers in a remaining range of the physical resources. If a specific non-GBR bearer is selected among the non-GBR bearers, the base station may preferentially allocate physical resources for the specific non-GBR bearer to secure a predetermined bit rate thereon and then certain physical resources for the other non-GBR bearers in a range of the physical resources remaining after allocation for the specific non-GBR bearer.

As described above, the base station may first classify bearers into GBR and non-GBR bearers based on QCI information and second determine a specific non-GBR bearer on which a predetermined bit rate is guaranteed among the non-GBR bearers according to a metric configured in association with at least one of the QCI information, ARP information, and SPID information, according to an embodiment of the disclosure.

According to an embodiment of the disclosure, the base station performs resource allocation in consideration of a resource allocation prioritization metric preconfigured based on the characteristics of a service itself (above-described preconfigured metric) in addition to the QCI information corresponding to the service, thereby improving the service quality and satisfaction of all users.

For example, Internet Protocol Television (IPTV) and interactive Voice and Video are real-time services in which a service request made by a communication terminal should be responded to by a network or a base station in a predetermined time. Accordingly, it is preferable to prioritize such services over other services for resource allocation. Meanwhile, allocating a large amount of physical resources for maintaining high qualities of the real-time services such as IP TV and interactive Video is likely to decrease the number of other services being supported by sharing the constrained physical resources or disturb the qualities of the other services. Furthermore, because it is necessary to allocate more physical resources than required to a communication terminal configured with a bearer on which a predetermined bit rate should be guaranteed in case of receiving the service at a location where a signal transmitted by a base station is weak in strength, the aforementioned problem is likely to be aggravated.

The proposed method of the disclosure is advantageous in terms of improving qualities of all services being provided by a base station by adopting as far as possible a resource allocation scheme similar to that in use for GBR bearers for real-time services and another resource allocation scheme similar to that in use for non-GBR bearers for a small number of services causing the problem of consuming too many physical resources.

Figure 3A:
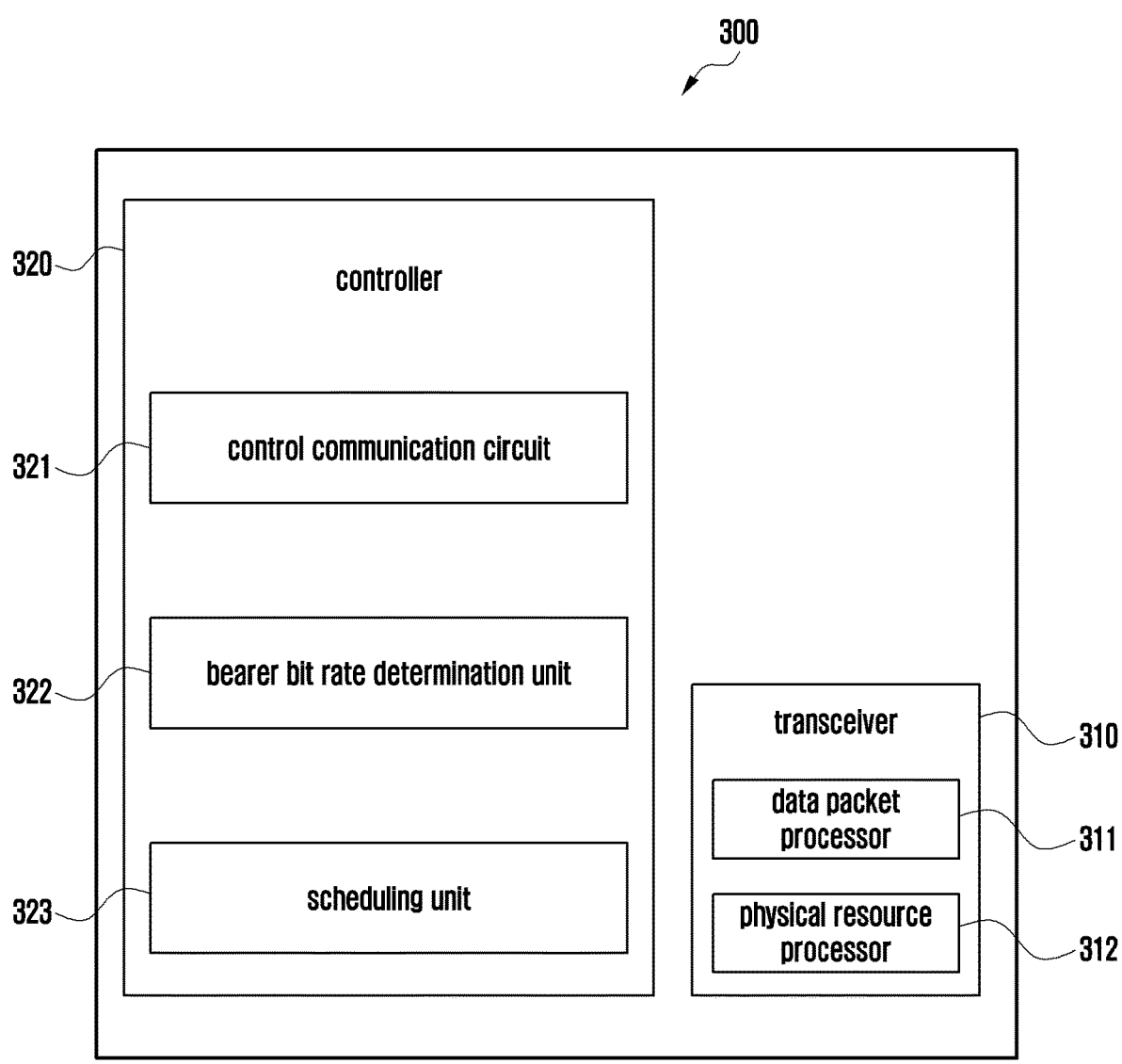
FIG. 3A is a block diagram illustrating a configuration of a base station according to an embodiment of the disclosure.
Figure 3B:
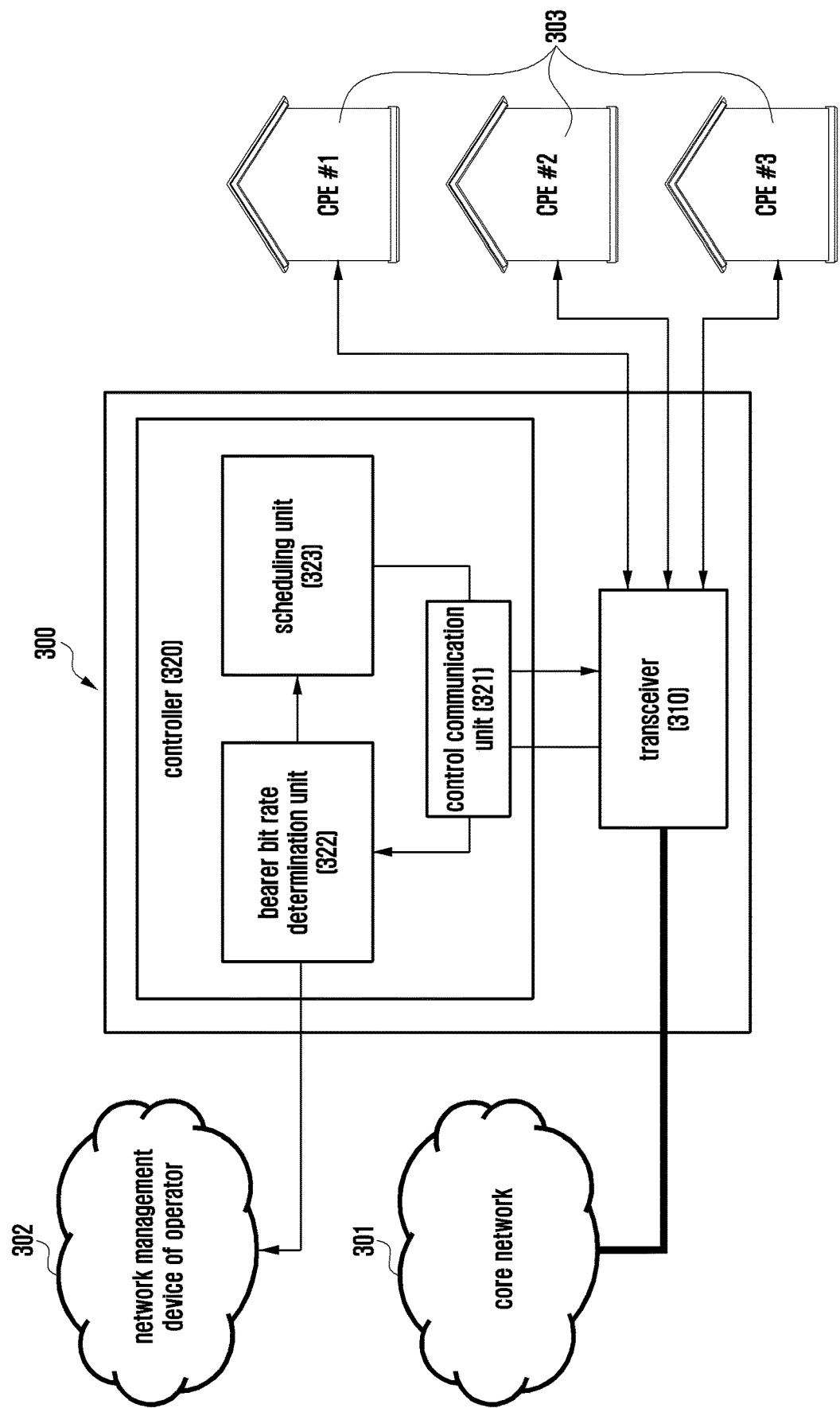
FIG. 3B is a conceptual diagram illustrating operation flows for implementing a method of a base station according to an embodiment of the disclosure.

FIG. 3A is a block diagram illustrating a configuration of a base station according to an embodiment of the disclosure, and FIG. 3B is a conceptual diagram illustrating operation flows for implementing a method of a base station according to an embodiment of the disclosure.

In the disclosed embodiment of FIG. 3A, the base station 300 may include a transceiver 310 and a controller 320.

According to an embodiment of the disclosure, the transceiver 310 may receive a downlink data packet from a high level core network and transmit the downlink data packet to a communication device through a radio medium. According to an embodiment of the disclosure, the transceiver 310 may transmit a message generated by the controller 320 to an external communication device. In detail, the transceiver 310 may include a data packet processor 311 that is responsible for processing of layered protocols such as GTP/PDCP/RLC/MAC in compliance with a predetermined standard and a physical resource processor 312 that is responsible for converting data to a format available for radio communication with the external communication device.

According to an embodiment of the disclosure, the base station 300 may include a controller 320. According to an embodiment of the disclosure, the controller 320 may further include a control communication circuit 321, a bearer bit rate determination unit 322, and a scheduling unit 323.

According to an embodiment of the disclosure, the control communication circuit 321 may process messages for communication with a core network and an external communication device. For example, if a new communication device is connected or a connected communication device requests for a new service, the control communication circuit 321 may check a service request message for SIPD information and QoS-related information of the requested service, e.g., QCI, ARP, minimum bit rate (MBR), and guaranteed bit rate (GBR), and control the transceiver 310 to transmit a bearer setup request message to the core network for the requested service.

The bearer bit rate determination unit 322 may control the scheduling unit 322 to perform resource allocation for guaranteeing a bit rate on the bearers configured with the QCI corresponding to the GBR via the control communication circuit 321.

The bearer bit rate determination unit 322 may also determine whether to guarantee a predetermined bit rate on the bearers configured with a QCI corresponding to a non-GBR among the bearers available for all communication devices connected to the base station based on at least one of the QCI information, ARP information, and SPID information via the control communication circuit 321. For this purpose, the bearer bit rate determination unit 322 may store a criterion preconfigured based on at least one of the QCI information, ARP information, and SPID information of the non-GBR bearer according to an embodiment of the disclosure. As described with reference to FIG. 2A, the metric may be preconfigured for each of uplink and downlink, and the predetermined bit rate may also be stored in advance according to an embodiment of the disclosure.

In detail, the bearer bit rate determination unit 322 may determine a specific bearer on which the predetermined bit rate is guaranteed based on the priority of the ARP information among the bearers of which QCIs are in a predetermined range among the identified non-GBR bearers according to a first metric. The bearer bit rate determination unit 322 may also determine specific bearers based on priorities of QCI information and select a bearer preferentially among the determined bearers based on priorities of ARB information according to a second metric.

If the bearer bit rate determination unit 322 determines the bit rate for the bearer, the scheduling unit 323 may schedule packet transmission of at least one communication device based on a result of the determination made by the bearer bit rate determination unit 322.

For example, according to an embodiment of the disclosure, the scheduling unit 323 may preferentially allocate physical resources to at least one device to secure a bit rate value corresponding to a GBR bearer. According to an embodiment of the disclosure, the scheduling unit 323 may allocate physical resources for a specific non-GBR bearer to secure a predetermined bit rate thereon among non-GBR bearers. According to an embodiment of the disclosure, the scheduling unit 323 may allocate physical resources for the GBR bearers and the specific non-GBR bearer and then certain physical resources for other non-GBR bearers in a remaining range of the physical resources.

Descriptions are made of the core network, communication devices, and base station according to an embodiment of the disclosure with reference to FIG. 3B.

According to an embodiment of the disclosure, the transceiver 310 may transmit a message including QoS-related information to the core network 301. As described with reference to FIG. 1, this message may correspond to the initial context setup request message or the bearer setup request message. The control communication circuit 321 may receive the message transmitted by the core network 301 from the transceiver 310 and send the message to the bearer bit rate determination unit 322 of the controller 320.

According to an embodiment of the disclosure, the bearer bit rate determination unit 322 may determine a type of a bearer to be configured to the communication device 303 based on the QoS-related information (e.g., QCI information and ARP information) included in the received message. As described with reference to FIG. 3A, the bearer bit rate determination unit 322 may determine a bit rate that should be secured on the bearer based on the type of the bearer.

According to an embodiment of the disclosure, the bearer bit rate determination unit 322 may report a radio (air) status of the communication devices located within a coverage area to a network management device 302 of the operator based on satisfaction of a predetermined condition. For example, if it is satisfied that the CQI information that is periodically reported by the communication devices is equal to or greater than a predetermined value over a predetermined time period or the amount of physical resources allocated to a specific communication device is equal to or greater than a predetermined value over a predetermined time period, the corresponding information may be reported to the network management device 302 of the operator.

According to an embodiment of the disclosure, the transceiver 310 may receive channel status information indicating the channel quality on each of the bearers configured to the communication device 303 from the communication device 303. According to an embodiment of the disclosure, the transceiver 310 may send the channel status information to the controller 320 at a predetermined interval. For example, according to an embodiment of the disclosure, the transceiver 310 may send the channel status information to the scheduling unit 322 of the controller 320.

Once the per-bearer bit rates are determined, the bearer bit rate determination unit 322 may send a determination result to the scheduling unit 322, which allocates physical resources on each bearer based on the determination result. Here, the bearer bit rate determination unit 322 may send final scheduling information for physical resource allocation to the scheduling unit 323 in consideration of the channel status information received at the predetermined interval. Although not shown in the drawing, the final scheduling information generated by the bearer bit rate determination unit 322 may be sent to the scheduling unit 323 via a predetermined interface.

The scheduling unit 323 may allocate physical resources per bearer based on the final scheduling information. The transceiver 310 may transmit a signal to notify at least one communication device 303 of the allocated physical resources.

According to an embodiment of the disclosure, the base station may perform scheduling on each of the bearers based on the channel statuses of the bearers configured to the at least one communication device. For example, if the channel condition is bad on the GBR bearers configured to a communication device, it may be possible to allocate an amount of physical resources that is more than required when the channel condition is good in order to guarantee a bit rate corresponding to the GBR bearer.

If the channel condition varies on each of the bearers configured to at least one communication device, the base station may perform scheduling per bearer by reflecting the varying channel condition. In this case, maintaining the bit rate determined to be guaranteed on a non-GBR bearer according to an embodiment of the disclosure even in a situation where the channel condition is bad may impact on the physical resource amount in the communication system. In this case, the base station may determine whether to allocate physical resources for securing the bit rate for the non-GBR bearer according to an embodiment of the disclosure. A detailed description thereof is made with reference to FIGS. 4A, 4B, and 5.

Figure 4A:
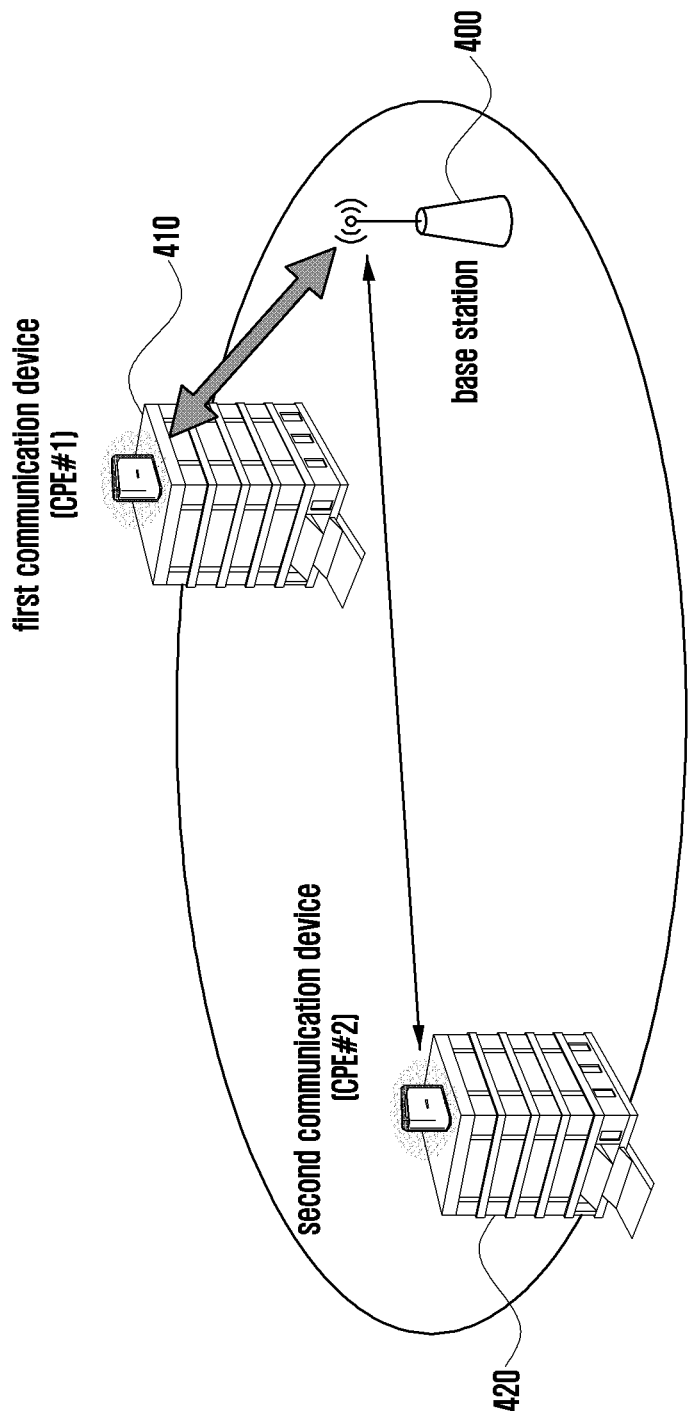
FIG. 4A is a diagram illustrating an exemplary connection between a base station and communication devices in a communication system according to an embodiment of the disclosure.
Figure 4B:
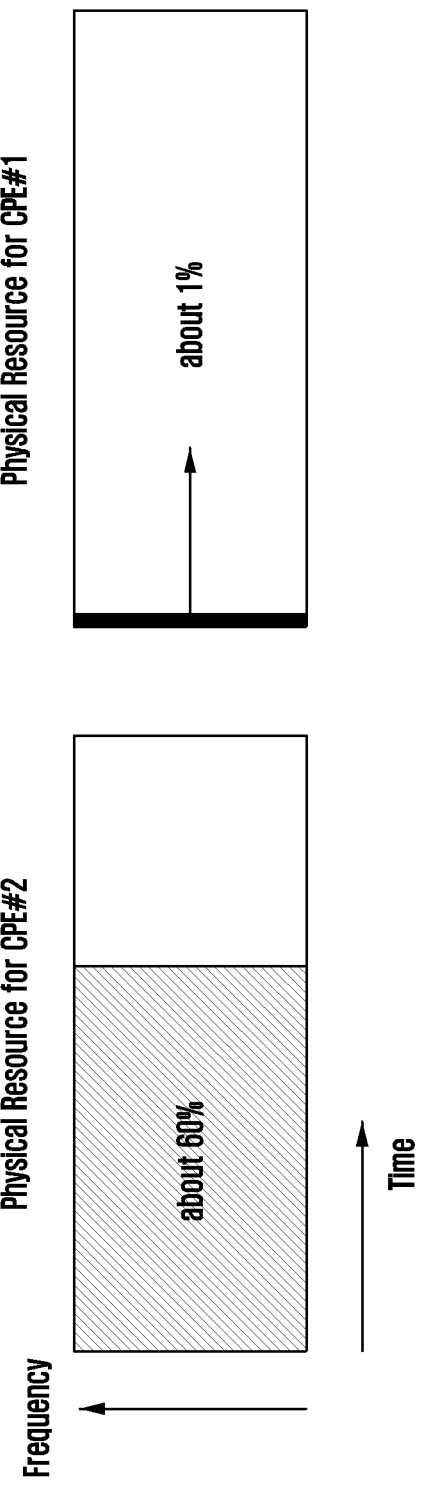
FIG. 4B is a diagram illustrating resource utilization amounts of the communication devices in FIG. 4A.

FIG. 4A is a diagram illustrating an exemplary connection between a base station and communication devices in a communication system according to an embodiment of the disclosure, and FIG. 4B is a diagram illustrating resource utilization amounts of the communication devices in FIG. 4A.

In the embodiment of FIG. 4A, a first communication device 410 and a second communication device 420 are located within a coverage area of a base station 400. As shown in FIG. 4A, the first communication device 410 is located at a location advantageous for communication with the base station 400, and the second communication device 420 is located at an edge of the coverage area where the electric field is the weakest so as to be disadvantageous for communication with the base station 400 in comparison with the first communication device 410.

For example, assuming that the non-GBR bearers configured to the first and second communication devices 410 and 420 are first and second non-GBR bearers respectively, each of the first and second non-GBR bearers guarantees a predetermined bit rate as described in the embodiment of FIG. 2. According to an embodiment of the disclosure, the base station 400 may receive channel status information of each of the first and second non-GBR bearers.

In the embodiment of FIG. 4A, the locations of the first and second communication devices 410 and 420 within the coverage area of the base station 400 may affect channel quality. That is, the channel quality on the first non-GBR bearer may be better than the channel quality on the second non-GBR bearer. In this case, although the base station provides the first and second communication devices with the same service, it has to allocate more physical resources for the first non-GBR bearer in order to guarantee the predetermined bit rate even with the poor channel quality thereon.

As shown in FIG. 4B, the base station performs scheduling to allocate much more physical resources to the second communication device 420 for providing the first and second communication device 420 with the same service. Given the constrained physical resources, if the physical resources allocated for the second non-GBR bearer are much more than the physical resources allocated for the first no-GBR bearer, a problem may arise in providing other services.

According to an embodiment of the disclosure, the base station may determine whether to secure a predetermined bit rate in consideration of the channel condition even when a non-GBR bearer is determined as a specific non-GBR bearer. Hereinafter, a description is made of the method for determining whether to perform physical resource allocation to secure the predetermined bit rate for the bearers determined as specific non-GBR bearers among the non-GBR bearers.

Figure 5:
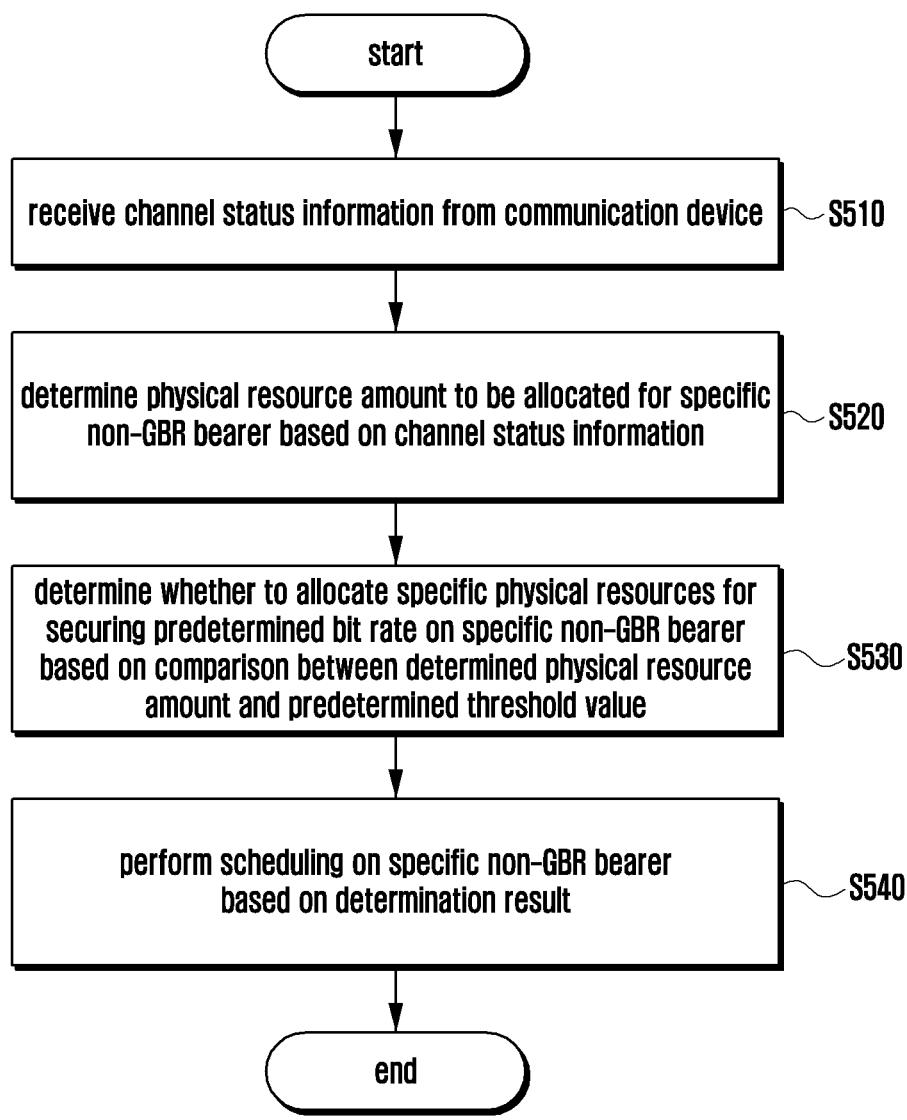
FIG. 5 is a flowchart illustrating a method for allocating physical resources for a specific non-GBR bearer according to an embodiment of the disclosure.

FIG. 5 is a flowchart illustrating a method for allocating physical resources for a specific non-GBR bearer according to an embodiment of the disclosure.

In the embodiment of FIG. 5, a base station may receive, at step S510, channel status information indicating a channel quality from a communication device.

Here, the channel status information indicating the channel quality may include CQI information. According to an embodiment of the disclosure, the communication device may transmit the CQI information to the base station periodically.

According to an embodiment of the disclosure, upon receipt of the CQI information from the communication device, the base station may determine, at step S520, a physical resource amount to be allocated for the specific non-GBR bearer based on the CQI information.

According to an embodiment of the disclosure, the base station may determine the physical resource amount based on Equations 1 and 2.

$$\tilde{p}_i = f(GBR_i, \widetilde{MCS}_i) \qquad \text{Equation 1}$$
$$= \sim \sim \sim TBD$$

Equation 1 is a formula for deducing the maximum value of the physical resource amount being allocated for the specific non-GBR bearer configured to the $i^{th}$ communication device from a modulation and coding scheme (MCS) in the case where total N communication devices are connected within the coverage area and may be computed through interpolation or extrapolation referencing a chart determined by a specific equation or input previously.

Here, i satisfies $0 \leq i \leq N$, and GBRi denotes a system parameter related to a predetermined bit rate to be guaranteed on a specific non-GBR bearer as described above and may be set to a value for each of QCI information and ARP information.

Here, $\widetilde{MCS}$ is used by time-averaging.

$$\tilde{P} = \Sigma_{i=1}^{N} \tilde{p}_i \qquad \text{Equation 2}$$

Equation 2 is an estimation value of a physical resource amount allocated for all specific non-GBR bearers within the coverage area.

According to an embodiment of the disclosure, after calculating the physical resource amount to be allocated to the specific non-GBR bearer based on Equations 1 and 2, the base station may determine at step S530 whether to allocate specific physical resources for securing the predetermined bit rate for the specific non-GBR based on a result of a comparison between the determined physical resource amount and a predetermined threshold value.

According to an embodiment of the disclosure, if it is determined that the determined physical resource amount is greater than the predetermined threshold value as a result of the comparison between the determined physical resource amount and the predetermined threshold value, the base station may determine not to allocate specific physical resources to the specific non-GBR bearer. That is, the base station may determine not to guarantee the predetermined bit rate on the specific non-GBR. In this case, the specific non-GBR bearer that has been treated as a GBR bearer may be treated as a normal non-GBR bearer so as to be allocated arbitrary physical resources in a best effort resource allocation scheme.

According to an embodiment of the disclosure, if it is determined that the determined physical resource amount is less than the predetermined threshold value, the base station may determine to allocate specific physical resources to the specific non-GBR bearer. According to an embodiment of the disclosure, the base station may treat the specific non-GBR bearer as a GBR bearer according to a metric related to the QCI information.

According to an embodiment of the disclosure, the base station may perform, at step S540, scheduling on the specific non-GBR bearer based on a result of the determination made according to the physical resource amount of the specific non-GBR bearer.

As described above, according to an embodiment of the disclosure, the base station may determine not to guarantee a specific bit rate for the specific non-GBR bearer based on the CQI information being periodically received from the communication device configured with the specific non-GBR bearer, even when the bit rate is guaranteed for the specific non-GBR bearer according to the characteristics of a service. That is, according to an embodiment of the disclosure, the base station may dynamically determine whether to guarantee a bit rate on the specific non-GBR bearer based on the channel condition, thereby efficiently utilizing constrained physical resources.

In the above-disclosed embodiments, the descriptions have been made under the assumption of one specific non-GBR bearer. Meanwhile, according to an embodiment of the disclosure, multiple communication devices may be each configured with one or more non-GBR bearers, and a description is made of the method for allocating physical resources for multiple specific non-GBR bearers hereinafter by way of another example.

Figure 6A:
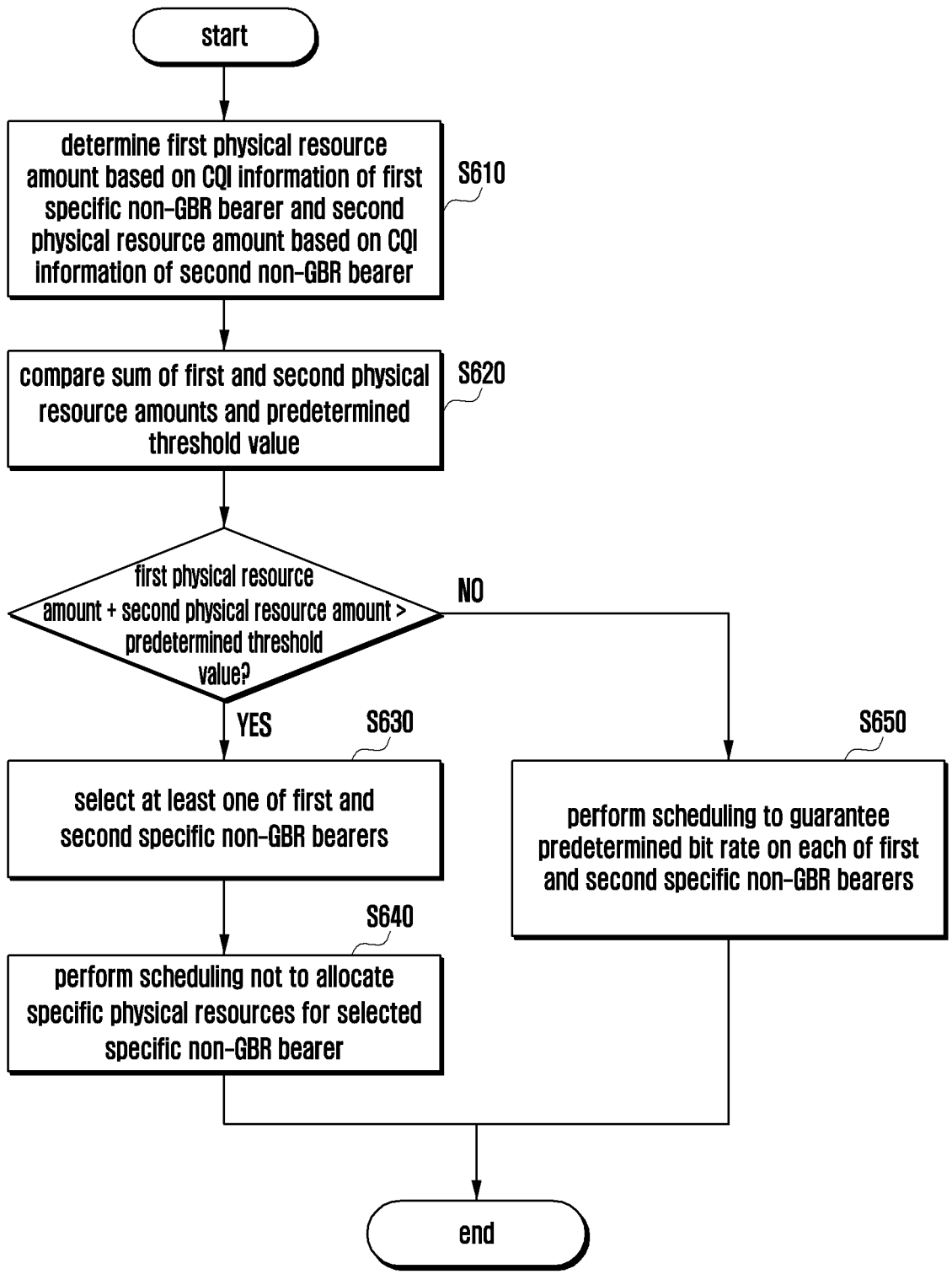
FIG. 6A is a flowchart illustrating a method for allocating physical resources for multiple specific non-GBR bearers according to an embodiment of the disclosure.
Figure 6B:
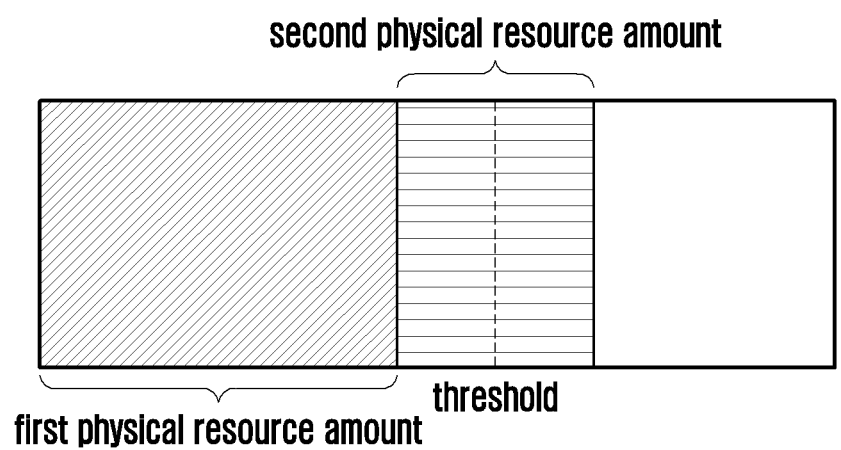
FIG. 6B is a diagram illustrating physical resources allocated for specific non-GBR bearers according to an embodiment of the disclosure.

FIG. 6A is a flowchart illustrating a method for allocating physical resources for multiple specific non-GBR bearers according to an embodiment of the disclosure, and FIG. 6B is a diagram illustrating physical resources allocated for specific non-GBR bearers according to an embodiment of the disclosure.

This embodiment is directed to a method for allocating physical resources for multiple specific non-GBR bearers in the case where a predetermined bit rate is guaranteed on multiple non-GBR bearers configured in a coverage area of a base station. Different specific non-GBR bearers are defined and described as first and second specific non-GBR bearers hereinafter.

In the embodiment of FIG. 6A, a base station may receive CQI information of the first specific non-GBR bearer and CQI information of the second specific non-GBR bearer. According to an embodiment, the base station may determine a physical resource amount based on a channel condition of each specific non-GBR bearer.

That is, according to an embodiment of the disclosure, the base station may determine, at step S610, a first physical resource amount as the physical resource amount of the first non-GBR bearer based on the CQI information of the first specific non-GBR bearer and a second physical resource amount as the physical resource amount of the second specific non-GBR bearer based on the CQI information of the second specific non-GBR bearer.

According to an embodiment of the disclosure, the base station may compare the sum of the first and second physical resource amounts with a predetermined threshold value at step S620.

That is, according to an embodiment of the disclosure, the base station may determine whether the sum of the first and second physical resource amounts is greater than the threshold value set based on a total physical resource amount.

According to an embodiment of the disclosure, if it is determined that the sum of the first and second physical resource amounts is greater than the predetermined threshold value, the base station may determine not to guarantee a predetermined bit rate on at least one of the first and second specific non-GBR bearers.

In more detail, according to an embodiment of the disclosure, the base station may select at least one of the first and second specific non-GBR bearers at step S630.

According to an embodiment of the disclosure, the base station may select one of the first and second specific non-GBR bearers based on the physical resource amounts. According to an embodiment of the disclosure, if the sum of the first and second physical resource amounts is greater than a predetermine threshold value as shown in FIG. 6B, the base station may select the specific non-GBR bearer with the largest one of the first and second physical resource amounts.

According to an alternative embodiment of the disclosure, the base station may select the specific non-GBR bearer to which a packet to be transmitted is allocated later between the first and second specific non-GBR bearers. For example, it may be the case where a request for a first service is followed by a request for a second service such that the first physical resource amount is allocated for the first specific non-GBR bearer corresponding to the first service and then the second physical resource amount is allocated for the second specific non-GBR bearer corresponding to the second service.

According to an embodiment of the disclosure, if the allocation of the first physical resource amount is followed by the allocation of the second physical resource amount, the base station may select the second specific non-GBR bearer.

According to an embodiment of the disclosure, if at least one specific non-GBR bearer is selected, the base station may perform, at step S640, scheduling not to allocate specific physical resources for guaranteeing the predetermined bit rate on the selected specific non-GBR bearer.

According to an embodiment of the disclosure, if the first specific non-GBR bearer is selected, the base station may allocate arbitrary physical resources to the first specific non-GBR bearer in a range of the physical resources remaining after physical resource allocation to the GBR bearers and the second specific non-GBR bearer. Likewise, according to an embodiment of the disclosure, if the second specific non-GBR bearer is selected, the base station may perform scheduling to allocate physical resources to the second specific non-GBR bearer in a range of the physical resources remaining after physical resource allocation to the GBR bearers and the first specific non-GBR bearer.

According to an embodiment of the disclosure, if the sum of the first and second physical resource amounts is not greater than the predetermined threshold value, the base station may perform, at step S650, scheduling to guarantee the specific bit rate on each of the first and second specific non-GBR bearers.

According to an embodiment of the disclosure, it is possible to improve the quality of a service by allowing, even though non-GBR bearers are assigned to the service, a base station to perform scheduling to guarantee a predetermined bit rate on a specific non-GBR bearer in consideration of the characteristics of the service. It is also advantageous in terms of utilizing physical resources efficiently according to the situation by periodically receiving a channel status report on the specific non-GBR bearer and determining whether to keep guaranteeing the bit rate based on the channel condition.

It is to be appreciated that those skilled in the art can change or modify the embodiments without departing from the technical concept of this invention. Accordingly, it should be understood that the above-described embodiments are essentially for illustrative purposes only and not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method of for performing wireless communication by a base station, the method comprising:
    identifying at least one non-guaranteed bit rate (non-GBR) bearer configured for a communication device;
    determining whether to guarantee a predetermined bit rate on the non-GBR bearer based on at least one of quality of service (QoS) class identifier (QCI) information, allocation and retention priority (ARP) information, and subscriber profile identifier (SPID) that are received in association with the non-GBR bearer from a core network node;
    allocating physical resources for the non-GBR bearer to secure the predetermined bit rate based on a determination made to guarantee the predetermined bit rate on the non-GBR bearer; and
    allocating physical resources arbitrarily for the non-GBR bearer in a range of the physical resources remaining after allocation for at least one GBR bearer configured to an arbitrary communication device within the physical resources corresponding to a transmission time interval (TTI) based on a determination made not to guarantee the bit rate on the non-GBR bearer.

2. The method of claim 1, wherein the determining to guarantee the predetermined bit rate on the non-GBR bearer comprises determining to guarantee the predetermined bit rate on the non-GBR bearer based on a priority of the ARP information of non-GBR bearers of which QCI information is in a predetermined QCI value range among the non-GBR bearers.

3. The method of claim 1, wherein the determining to guarantee the predetermined bit rate on the non-GBR bearer comprises:
    determining based on a priority of the QCI information among the non-GBR bearers; and
    determining, in case the determined non-GBR bearers have the same QCI information, based on a priority of the ARP information of the determined non-GBR bearers.

4. The method of claim 1, further comprising:
    receiving channel status information indicating a channel quality from the communication device; and
    determining, based on channel status information, whether to allocate specific physical resources for securing the predetermined bit rate on a specific non-GBR bearer determined for the predetermined bit rate to be guaranteed thereon,
    wherein the channel status information comprises channel quality indicator (CQI) information, and
    wherein the determining of whether to allocate the specific physical resources comprises:
        determining a physical resource amount to be allocated for the specific non-GBR bearer based on the received CQI information, and
        determining whether to allocate the specific physical resources for the specific non-GBR bearer based on a comparison between the determined physical resource amount and a predetermined threshold value.

5. The method of claim 4, further comprising:
    determining a first physical resource amount of a first specific non-GBR bearer based on the CQI information received for the first specific non-GBR bearer and a second physical resource amount of a second specific non-GBR bearer based on the CQI information received for the second specific non-GBR bearer;
    comparing a sum of the first and second physical resource amounts with a predetermined threshold value;
    selecting at least one of the first and second specific non-GBR bearers based on the sum of the first and second physical resource amounts being greater than the predetermined threshold value; and
    determining not to allocate the specific physical resources for the selected specific non-GBR bearer.

6. The method of claim 5, wherein the selecting comprises selecting the first specific non-GBR bearer based on the first physical resource amount being greater than the second physical resource amount.

7. The method of claim 5, wherein the selecting comprises selecting the specific non-GBR bearer to which a packet to be transmitted is assigned later between the first and second specific non-GBR bearers.

8. A base station for performing wireless communication, the base station comprising:
    a transceiver configured to receive quality of service (QoS) class identifier (QCI) information of at least one non-guaranteed bit rate (non-GBR) bearer configured to a communication device from a core network; and
    a controller configured to:
        identify a non-GBR bearer configured for the communication device,
        determine whether to guarantee a predetermined bit rate on the non-GBR bearer based on the QCI information,
        allocate physical resources for the non-GBR bearer to secure the predetermined bit rate based on a determination made to guarantee the predetermined bit rate on the non-GBR bearer, and
        allocate physical resources arbitrarily for the non-GBR bearer in a range of the physical resources remaining after allocation for at least one GBR bearer configured to an arbitrary communication device within the physical resources corresponding to a transmission time interval (TTI) based on a determination made not to guarantee the bit rate on the non-GBR bearer.

9. The base station of claim 8, wherein the controller is further configured to determine to guarantee the predetermined bit rate on the non-GBR bearer based on a priority of allocation and retention priority (ARP) information of non- GBR bearers of which QCI information is in a predetermined QCI value range among the non-GBR bearers.

10. The base station of claim 8, wherein the controller is further configured to:
   guarantee the predetermined bit rate on the non-GBR bearer based on a priority of the QCI information among the non-GBR bearers, and
      in case the determined non-GBR bearers have the same QCI information, guarantee the predetermined bit rate on the non-GBR bearer based on a priority of allocation and retention priority (ARP) information of the determined non-GBR bearer.

11. The base station of claim 8,
   wherein the transceiver is further configured to receive channel status information indicating a channel quality from the communication device, and
   wherein the controller is further configured to:
      determine, based on channel status information, whether to allocate specific physical resources for securing the predetermined bit rate on a specific non-GBR bearer determined for the predetermined bit rate to be guaranteed thereon, the channel status information comprising channel quality indicator (CQI) information,
      determine a physical resource amount to be allocated for the specific non-GBR bearer based on the received CQI information, and
      determine whether to allocate the specific physical resources for the specific non-GBR bearer based on a comparison between the determined physical resource amount and a predetermined threshold value.

12. The base station of claim 11, wherein the controller is further configured to:
   determine a first physical resource amount of a first specific non-GBR bearer based on the CQI information received for the first specific non-GBR bearer and a second physical resource amount of a second specific non-GBR bearer based on the CQI information received for the second specific non-GBR bearer,
   select at least one of the first and second specific non-GBR bearers based on a sum of the first and second physical resource amounts being greater than the predetermined threshold value, and
   determine not to allocate the specific physical resources for the selected specific non-GBR bearer.

13. The base station of claim 12, wherein the controller is further configured to select the first specific non-GBR bearer based on the first physical resource amount being greater than the second physical resource amount or the specific non-GBR bearer to which a packet to be transmitted is assigned later between the first and second specific non-GBR bearers.

* * * * *